Feb. 7, 1967

N. A. ZELLMER 3,303,429

GAIN REGULATION CIRCUIT EMPLOYING A HALL MULTIPLIER AS A VARIOLOSSER

Filed Sept. 3, 1963

INVENTOR.
NEALE A. ZELLMER

BY

Lippincott, Ralls & Hendricson
ATTORNEYS

United States Patent Office 3,303,429
Patented Feb. 7, 1967

3,303,429

GAIN REGULATION CIRCUIT EMPLOYING A HALL MULTIPLIER AS A VARIOLOSSER

Neale A. Zellmer, Belmont, Calif., assignor, by mesne assignments, to Automatic Electric Laboratories, Inc., Northlake, Ill., a corporation of Delaware Filed Sept. 3, 1963, Ser. No. 306,111
7 Claims. (Cl. 330—52)

The present invention relates to a gain regulation circuit for use with a carrier system, or the like, to automatically compensate for changes in the attenuation characteristics of the transmission medium. More specifically, the invention provides a gain regulator which employs a Hall multiplier as a variolosser to automatically adjust the loss (or gain) of the transmission medium in compensating relation to changes in the transmission characteristics of the medium arising from variations in environmental conditions and the like.

The variation in attenuation of a transmission medium due to changes in environmental conditions and the like is a serious problem in carrier systems and other communications networks. This problem has been conventionally solved by the employment of some means of automatic regulation with the transmission medium. For example, in carrier systems it is the usual practice to introduce an automatic level regulator circuit which typically monitors the level of a reference pilot signal contained in the signals transmitted by the medium and automatically adjusts the loss (or gain) in the repeater or terminal equipment to generate an error signal which in turn is used to compensate for changes in the attenuation of the transmission medium. Conventionally, this variolosser action is accomplished by using nonlinear elements, such as thermistors or diodes, in a passive network, e.g., a T, $\pi$, or bridge network, in such a way that an external control signal can be applied to vary the effective impedance of the nonlinear element and thereby vary the transmission loss of the network. The control signal may be derived, for example, from the reference pilot as some appropriate function of variations in the level thereof and applied to the variolosser in such a way as to vary the impedance in a direction to oppose the changes. Typically, however, devices such as thermistors or diodes that must be effectively biased to a point on their dynamic operating characteristics to obtain a certain desired effective impedance are limited in the amount of A.-C. signal power they can tolerate without materially degrading the linearity of the signal. Moreover, the ratio of signal-to-control power required in variolosser circuits of this type must be at least one to ten and preferably one to one hundred. This often results in circuits with very low efficiency.

The present invention overcomes the foregoing limitations and disadvantages associated with conventional gain regulation circuits wherein nonlinear elements such as thermistors or diodes are employed as a variolosser, by providing a gain regulation circuit which uses a Hall multiplier as the variolosser element. A Hall multiplier is a device that exploits the phenomenon discovered by the physicist, Edwin Hall, in 1879 and subsequently named the Hall effect for its discoverer. In accordance with the Hall effect, the perpendicular force exerted by a magnetic field on charge carriers passing through a conducting medium deflects the carriers such that there is a greater accumulation of carriers at one side of the conducting medium than at the other and, accordingly, a voltage potential exists between the two sides of the medium. This potential is referred to as Hall voltage and is proportional to the cross-product of the magnetic field and the current passing through the conducting medium. As used in this invention, the Hall multiplier includes a monolithic polycrystalline semiconductor crystal as the conducting medium. An input signal containing an A.-C. pilot is applied to the crystal to give rise to the flow of signal current therethrough. A control current is passed through a coil associated with a magnetic circuit perpendicular to the path of current through the crystal which has an amplitude proportional to the difference between the amplitude of the pilot signal passing through the crystal and a fixed reference signal. Any change in the magnitude of the control current is of such polarity as to cause the Hall output voltage derived from the crystal to change in the direction opposite to the direction of the change in amplitude of the pilot signal. The Hall output voltage is therefore kept relatively constant by the compensating effect of the change in the amplitude of the control current upon the change in amplitude of the A.-C. pilot input signal. Inasmuch as the crystal employed in the multiplier is a monolithic polycrystalline structure, the multiplier is an extremely linear device which is capable of withstanding high loading currents without appreciable degradation of signal linearity.

The invention will be better understood upon consideration of the following description taken in conjunction with the accompanying drawings, wherein.

Figures 1, 2:
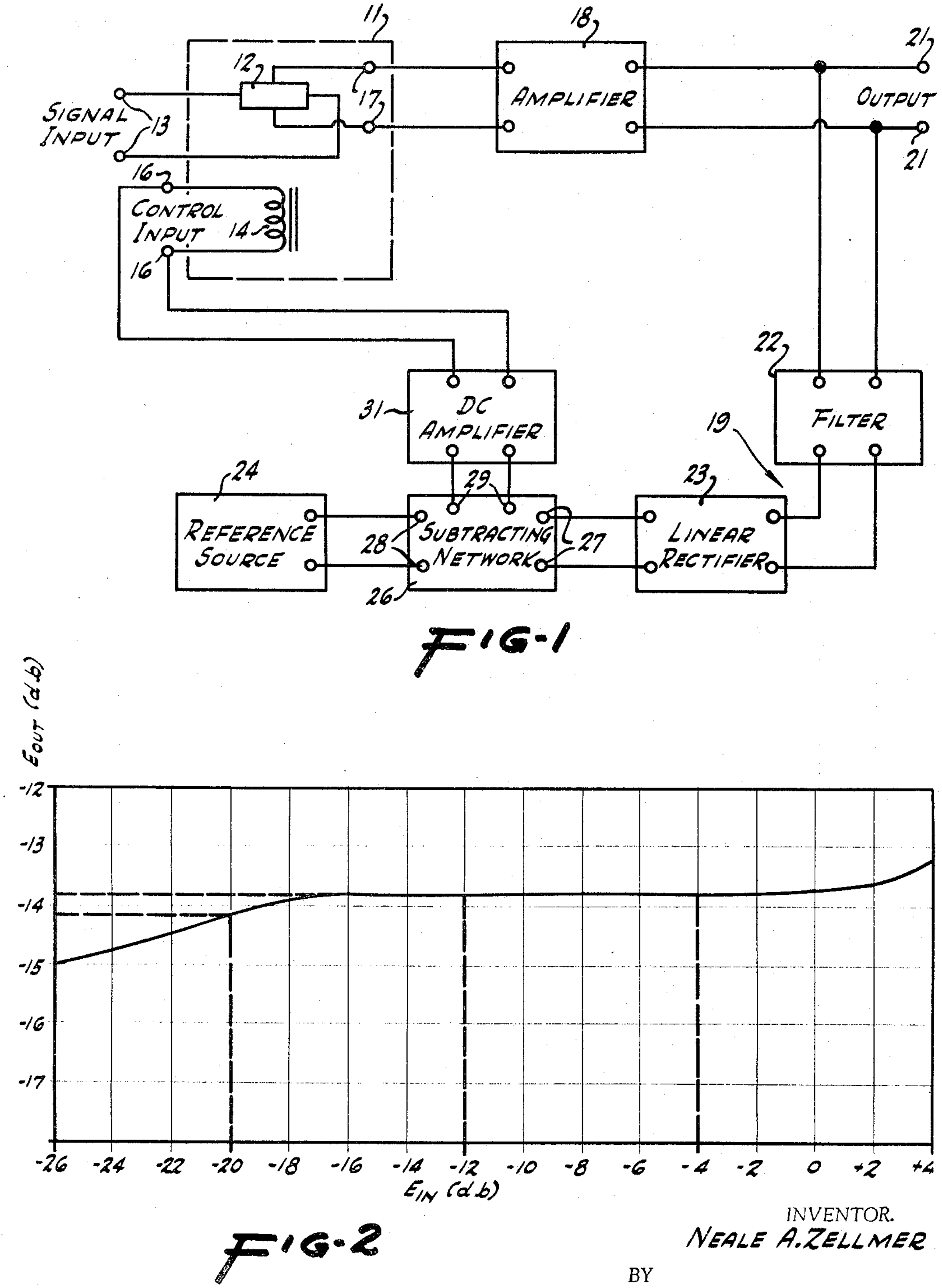
FIGURE 1 is a block diagram of the circuit of the present invention.
FIGURE 2 is a graphical illustration of the signal output versus signal input characteristics of a specific embodiment of the circuit which depicts the regulation thereof.

Referring to FIGURE 1, the gain regulation circuit of the present invention will be seen to include a Hall multiplier 11 which functions as a variolosser in the transmission medium of a carrier system, or the like, wherein it is important that attenuation or loss variations be compensated. More particularly, the Hall multiplier 11 includes a crystal 12, preferably of a semiconductor material, such as indium antimonide, which is of a monolithic polycrystalline structure. The opposite ends of the crystal 12 are connected to input terminals 13 which are adapted to receive an input signal from the transmission medium which is to be regulated to compensate for variations in the losses thereof. The multiplier further includes a coil 14 in association with a magnetic circuit arranged to produce a magnetic field perpendicular to the path of signal current through the crsytal 12 upon energization of the coil. The coil is connected to control input terminals 16 arranged to receive a control current which is derived in a manner subsequently described to be proportional to changes in the amplitude of an A.-C. pilot signal contained in the signal applied to terminals 13. Output terminals 17 of the multiplier are connected to the crsytal 12 to receive a Hall voltage therefrom. The Hall voltage arises from the perpendicular force exerted upon charge carriers flowing through the crystal 12 by the magnetic field generated in response to energization of the coil 14. This Hall voltage is proportional to the cross-product of the magnetic field (directly related to the magnitude of current through the coil), and the current flowing through the crystal. Accordingly, in the present instance the Hall output voltage at terminals 17 is proportional to the product of the input signal applied to terminals 13 and the control signal applied to terminals 16. As noted hereinbefore, the magnitude of the control current is proportional to changes in the amplitude of the A.-C. pilot signal; therefore, these changes are reflected in the Hall voltage at terminals 17. Moreover, the control current is derived in such a manner that changes in magnitude are of polarities which cause the Hall voltage to change in directions opposite from the directions of changes in the amplitude of the pilot signal. In other words, an increase in amplitude of the pilot signal produces a control current of relatively decreased magnitude. The Hall output voltage at terminals 17, being the product of the control current and the input signal, is correspondingly decreased in proportion to the increase in amplitude of the pilot signal. In a comparable manner, a decrease in the amplitude of the pilot signal effects a proportional increase in the level of the Hall voltage output signal at terminals 17. It will be, therefore, appreciated that changes in the level of the signal applied to terminals 13 due to loss variations in the transmission medium are continuously compensated to thereby provide a substantially constant level of signal at terminals 17.

Considering now the gain regulation circuit in greater detail, particularly as to the derivation of the control current applied to the control terminals 16 of the Hall multiplier 11 to effect gain regulation, it is first to be noted that because of inherent losses in the multiplier itself, it is preferable to amplify the gain controlled output signal at terminals 17, as by means of a typical broadband amplifier 18. The control current is then derived by means of a suitable feedback loop, generally indicated at 19, coupled between the output of amplifier 18 and the control terminals 16 of the multiplier 11 to provide a substantially constant signal level at output terminals 21, also coupled to the output of amplifier 18. The feedback loop then advantageously includes a pick-off filter 22 coupled to the output of amplifier 18 to selectively derive the A.-C. pilot signal therefrom. In this regard, the pilot signal is of a predetermined frequency and the filter is tuned to be passive thereto. The pilot signal, as selected by filter 22, is in turn applied to a linear rectifier 23 which rectifies the signal to provide a D.-C. signal at its output which is continuously proportional to the amplitude of the pilot signal. The direct current output of the rectifier 23 is compared to a direct current reference signal generated as by means of a reference source 24. In other words, the amplitude of the pilot signal, represented by the output of the rectifier, is compared to a fixed reference magnitude, represented by the reference signal from source 24. This comparison is preferably accomplished by means of a subtracting network 26, or equivalent means, arranged to provide an output signal which is proportional to the difference between two input signals applied thereto. More particularly, the output of rectifier 23 is coupled to a first input 27 of the subtracting network while the reference source 24 is coupled to a second input 28 thereof. An output signal proportional to the difference between the amplitude of the pilot signal and the fixed reference is thus in turn provided at an output 29 of the subtracting network. The signal at output 29 is thus indicative of departures in the ampled, preferably by means of D.-C. amplifier 31, to the reference signal. This difference or error signal is coupled, preferably by means of D.-C. amplifier 31, to the control input terminals 16 of the multiplier 11 to thereby provide control current flow in proportion to the difference signal. Furthermore, the circuit is arranged such that the control current changes in a direction opposite to the direction of a departure of the pilot signal amplitude from the fixed magnitude of the reference signal level as represented by the difference signal at the output 29 of the subtracting network 26. Assuming that a given control current flows when the difference or error signal at output 29 is zero, it is thus desired that the control current be decreased when the D.-C. pilot amplitude signal from rectifier 23 exceeds the fixed magnitude of the reference signal from source 24, and that the control current be increased when the pilot amplitude signal is less than the fixed reference signal. This, of course, may be variously accomplished such as by arranging subtracting network 26 to provide an output which is proportional to the pilot signal amplitude subtracted from the reference signal magnitude, and employing a noninverting amplifier as D.-C. amplifier 31. A pilot amplitude signal greater than the reference signal magnitude (indicative of an increase in amplitude of the pilot signal) consequently produces a negative difference or error signal, which as amplified by amplifier 31, is productive of a decrease in control current at the terminal 16 of the multiplier. Conversely, the error signal is positive when the pilot amplitude signal is less than the magnitude of the reference signal, such that the control current is correspondingly increased. Alternatively, the subtracting network 26 may be arranged to provide an error signal which is proportional to the reference signal subtracted from the pilot amplitude signal, in which case an excessive pilot amplitude signal results in a positive error signal, while a reduction in pilot amplitude is productive of a negative error signal. The D.-C. amplifier 31 is in this case arranged to invert the error signal to thereby provided control current which varies in the desired manner in inverse relation to the direction of departures of the pilot signal amplitude from the magnitude of the reference signal.

Thus, in either of the foregoing instances, the control current applied to terminals 16 of the multiplied varies in inverse proportion to variations in the amplitude of the A.-C. pilot signal as derived in the feedback loop 19 by comparison of the pilot signal amplitude with a fixed reference level. The control current hence continuously regulates the level of the input signal applied to terminals 13 of the multiplier in a direction to compensate for variable losses in the transmission medium coupled thereto, whereby the level of the signal at the output terminals 21 of the circuit is substantially constant.

Considering now the gain regulation circuit of FIGURE 1 from a mathematical standpoint, assume that an input signal is applied to terminals 13 which includes a pilot signal $e_{in}(t)$ which gives rise to an output pilot signal $e_o(t)$, at terminals 21. A control current $i_c$ is applied to control terminal 16 whereby the Hall voltage signal at terminals 17 is: $i_c e_{in}(t)$. With amplifier 18 having a gain, G, the output pilot signal is hence given by: $e_o(t)=Gi_c e_{in}(t)$. However, the control current, $i_c$, is proportional to: $G_m(E_R-Ae_o)$, where $G_m$ is the gain of D.-C. amplifier 31, $E_R$ is the magnitude of the reference signal generated by reference source 24, A is the conversion gain of rectifier 23, and $e_o$ is the amplitude of $e_o(t)$. Thus, disregarding constants of proportionality associated with resitsance and various other electrical characteristics of the circuit elements for purposes of simplicity, the control current may be expressed as: $i_c=G_m(E_R-Ae_o)$. Substituting this expression for the control current, $i_c$, in the foregoing expression for the output pilot signal, $e_o(t)$, there is obtained:

$$e_o(t)=GG_m(E_R-Ae_o)e_{in}(t)$$

Reducing to amplitudes only, the foregoing equation becomes: $e_o=GG_m(E_R-Ae_o)e_{in}$. Letting G′ equal $GG_m$, and solving for $e_o$, there is derived:

$$e_o=\frac{G'E_R e_{in}}{1+AG'e_{in}}$$

Consequently, in the range where $AG'e_{in}$ is significantly greater than 1, the foregoing expression becomes:

$$e_o\cong\frac{E_R}{A}$$

Thus, the amplitude, $e_o$, of the output pilot signal at terminals 21 is essentially independent of the amplitude, $e_{in}$ of the pilot signal at terminals 13, and will remain constant over the dynamic range bounded by the condition: $AG'e_n \gg 1$, as the lower limit, and the electrical saturation of the Hall multiplier 11 as the upper limit. The condition for the lower limit, being proportional to the over-all gain of the feedback loop, may, of course, be readily obtained by adjusting the gains of amplifiers 18 and 31 to relatively high values and/or by providing coil 14 with a relatively large number of turns. The latter expedient accrues inasmuch as the effectiveness of the control current is directly related to the strength of the magnetic field generated by the control current. The upper limit of the dynamic range may have substantial latitude through appropriate selection of core material for use in the magnetic circuit of the Hall multiplier 11.

In a specific embodiment of the circuit of FIGURE 1, a Hall multiplier was employed utilizing indium antimonide, having a crystal resistance of two ohms, as the multiplier crystal. In addition, a ferrite core was employed in the magnetic circuit of the multiplier with a 900 turn coil. A nominal level of −12 dbm was chosen for the level of the A.-C. pilot signal, while the constants of the circuit were selected to provide a nominal control current of 2.5 milliamps. With this specific circuit, an output signal versus input signal characteristic curve was obtained as illustrated in FIGURE 2. It is to be noted from the graph that the output signal is held substantially constant for a variation in input signal of ±8 db about the nominal −12 db pilot level. In addition, the "stiffness ratio," which is a figure of merit commonly used to describe the quality of a regulator and which is the ratio of the db variation of amplitude of the input signal to the db variation of the amplitude of the output signal, will be noted to be approximately 60. Both the dynamic range and stiffness ratio may be materially increased, moreover, by employment of core materials having higher maximum flux densities than is obtainable with ferrite, in the magnetic circuit of the Hall multiplier. It is also important to note that inasmuch as the crystal of the multiplier is a monolithic polycrystalline structure, it is, in contrast to the normal junction type nonlinear devices associated with semiconductors, a very linear device. More particularly, the crystal's linearity is limited primarily by a secondary magneto-resistance effect and, accordingly, the multiplier is capable of withstanding high loading currents without appreciable degradation of signal linearity.

Although the present invention has been described hereinbefore with respect to a single preferred embodiment, it will be appreciated that various changes and variations may be made therein without departing from the spirit and scope of the invention, and thus it is not intended to limit the invention except by the terms of the following claims.

What is claimed is:

1. A variolosser circuit using a Hall effect device comprising a crystal; input means for passing an input signal containing an A.-C. pilot signal through said crystal; a coil for applying a magnetic field to said crystal perpendicular to the path of the current of said input signal through said crystal, the strength of which field is proportional to the current through said coil; input means for passing a control current through said coil; means maintaining the amplitude of said control current proportional to changes in amplitude of said A.-C. pilot signal and of a polarity which causes the Hall output voltage of said crystal to change in the direction opposite from that of said change in amplitude of said A.-C. pilot signal; and output means for obtaining said Hall output voltage of said crystal, said output voltage being relatively constant because of the compensating effects between the changes in amplitude of said control current and the changes in amplitude of said A.-C. pilot signal.

2. The variolosser circuit of claim 1, further defined by said crystal being a semiconductor.

3. The variolosser circuit of claim 2, further defined by said semiconductor being indium antimonide.

4. A gain regulation circuit comprising a Hall multiplier including a semiconductor crystal adapted for the flow of current therethrough, means including a coil for generating a magnetic field perpendicular to the direction of current flow through the crystal, said field having a strength proportional to the current through said coil, and Hall voltage terminal means for deriving a Hall voltage from said crystal, said Hall voltage being proportional to the product of the currents through said crystal and said coil; means applying input signals containing an A.-C. pilot signal to said crystal to establish said flow of current therethrough; output means coupled to said Hall voltage terminal means receiving signals therefrom proportional to said input signals; feedback means coupled to said output means for deriving a D.-C. feedback signal proportional to changes in amplitude of the pilot signal contained in the input signals; a reference source generating a D.-C. reference signal; means coupled to said feedback means and said reference source generating an error signal proportional to the difference between said reference signal and said feedback signal and in inverse relation to the direction of changes in the amplitude of said pilot signal; and means coupling said error signal in energizing relation to said coil of said multiplier whereby the signals at said output means are of substantially constant level despite changes in level of said input signal.

5. A gain regulation circuit according to claim 4, further defined by said output means, said feedback means, said means generating an error signal, and said means coupling said error signal to said coil having an over-all gain such that the product of the over-all gain and amplitude of the pilot signal contained in the input signals is significantly greater than one.

6. A regulator comprising input terminals receiving signals containing an A.-C. pilot signal; a Hall multiplier including a semiconductor crystal connected to said input terminals and thereby having a current flow proportional to said signals, means including a coil for generating a magnetic field perpendicular to the direction of current flow through said crystal, said field having a strength proportional to the current through said coil, and Hall voltage terminal means for receiving a Hall voltage from said crystal proportional to the product of current flowing through said crystal and current flowing through said coil; an amplifier coupling said Hall voltage terminal means to output terminals; feedback means including a linear rectifier coupled to said output terminals for deriving a D.-C. feedback signal proportional to the amplitude of said pilot signal; a reference source generating a D.-C. reference signal; a subtracting network having inputs coupled to said feedback means and said reference source for generating an error signal proportional to the difference between said reference signal and feedback signal at output terminals of the subtracting network; and a second amplifier coupling said subtracting network output terminals to said coil of said multiplier to energize same in proportion to said error signal; said first and second amplifiers and said rectifier having an over-all gain such that the product of the over-all gain and amplitude of said pilot signal at said input terminals is substantially greater than unity, whereby the level of said signals at said output terminals is substantially constant over a wide range of levels of said signals at said input terminals.

7. A gain regulation circuit operating upon a broadband input signal containing an A.-C. pilot signal comprising a Hall multiplier having a first input receiving said input signal and coupled to a monolithic polycrystalline semiconductor crystal to pass the current of said input signal therethrough, a second input coupled to a coil for generating a magnetic field perpendicular to the flow of current through said crystal, said field having a strength proportional to the flow of a control current through said coil, and a Hall voltage output for providing a Hall voltage proportional to the product of the signal current through said crystal and the control current through said coil; a broadband amplifier having its input coupled to the output of said multiplier for providing an amplified output signal proportional to said Hall voltage; means coupled to the output of said amplifier for filtering a feedback signal proportional to said pilot signal from said output signal; means for rectifying said feedback signal to obtain a D.-C. signal of amplitude proportional to the amplitude of said A.-C. pilot signal; means generating a fixed D.-C. reference signal; a subtracting network having first and second inputs respectively receiving the rectified D.-C. signal and said reference signal and having an output, said network producing an error signal at its output proportional to the difference between said rectified D.-C. signal and said reference signal at its inputs and thereby proportional to changes in the amplitude of said pilot signal from said reference signal; and a D.-C. amplifier coupling the output of said subtracting network to the second input of said multiplier to apply said error signal thereto with a polarity to oppose said changes in the amplitude of said pilot signal.

References Cited by the Examiner

UNITED STATES PATENTS

| | | | |
|---|---|---|---|
| 3,015,782 | 1/1962 | Pihl | 330—145 |
| 3,189,838 | 6/1965 | Leger | 330—6 |
| 3,196,355 | 7/1965 | Berry et al. | 325—407 |

ROY LAKE, *Primary Examiner.*

N. KAUFMAN, *Assistant Examiner.*